Patented Apr. 17, 1923.

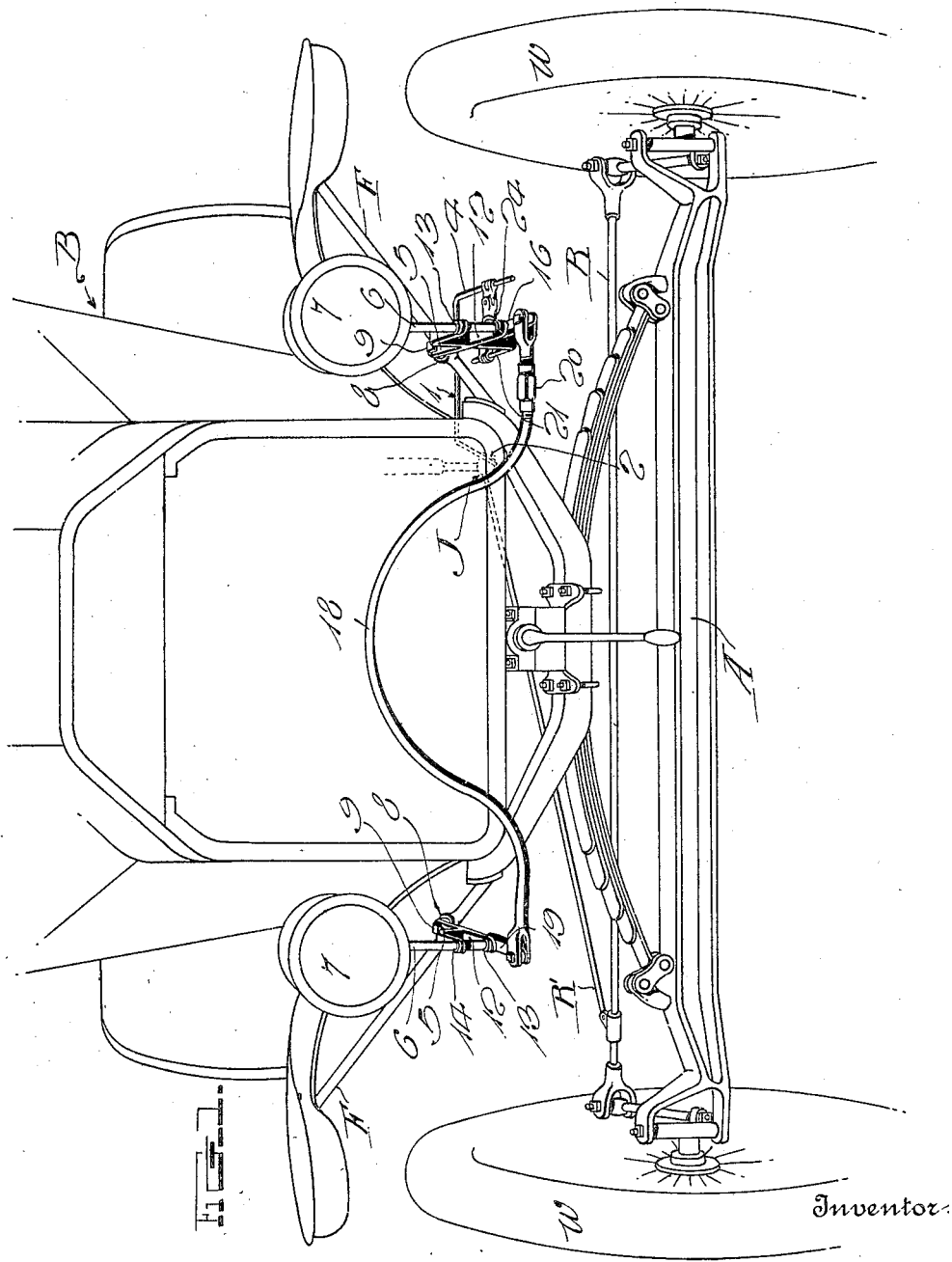

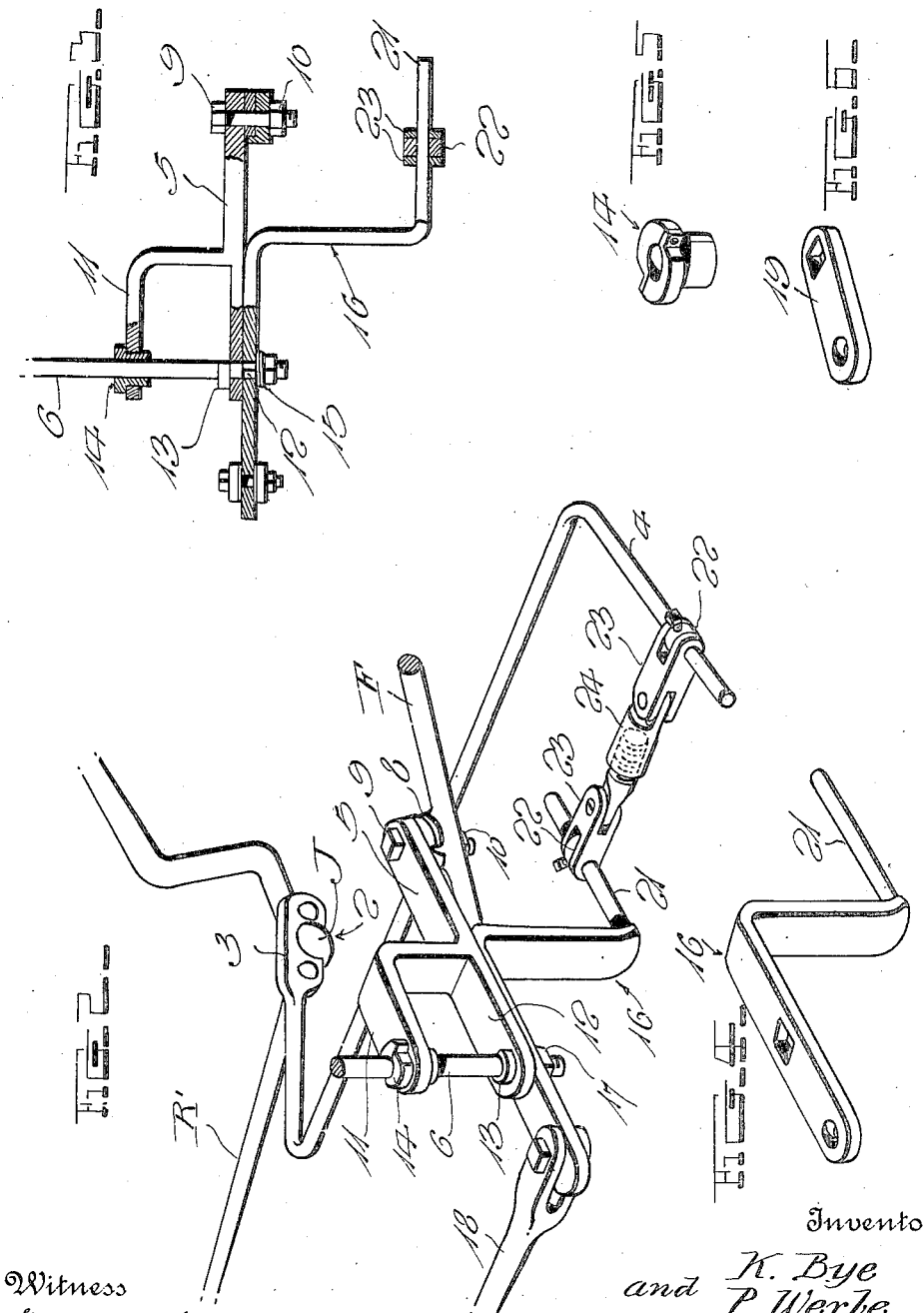

1,451,862

UNITED STATES PATENT OFFICE.

KARL BYE AND PHILIP WERLE, OF BUTTE, MONTANA.

VEHICLE HEADLIGHT.

Application filed November 3, 1921. Serial No. 512,545.

*To all whom it may concern:*

Be it known that we, KARL BYE and PHILIP WERLE, citizens of the United States, residing at Butte, in the county of Silver Bow and State of Montana, have invented certain new and useful Improvements in Vehicle Headlights; and we do declare the following to be a full, clear, and exact description of the invention, such as will enable others skilled in the art to which it appertains to make and use the same.

This invention relates to improvements in headlights for vehicles, having more particular reference to the type of lights used on Ford automobiles.

The principal object of the invention is to so arrange and mount the headlights, as to permit them to turn with the front wheels, that is, to follow the path taken by the front wheels, thus insuring that the roadway will be at all times properly lighted in advance of the automobile, even when rounding curves and turning corners.

Another, and important object of the invention is to generally improve upon dirigible headlights for vehicles by providing a structure, which is especially, but not necessarily adapted for use in connection with Ford cars, the construction being such as to permit the device to be readily and easily applied by inexperienced persons without necessitating any material changes of the existing parts of the car to which the headlights are attached.

A further object of the invention is to provide a headlight structure for automobiles, wherein a rod is employed for connecting the two lights together for simultaneous operation, this rod being disconnectible from one of the lights to permit one light to be free to turn throughout an entire revolution if desired, so that it can be used as a "trouble light."

A still further object of the invention is to provide a headlight structure embodying means for limiting the angular movements of the light.

Another object of the invention is to provide an arrangement wherein the lights are controlled by the action of the steering gear.

Other objects and advantages of the invention will be apparent during the course of the following description.

In the accompanying drawings forming a part of this specification and in which like numerals are employed to designate like parts throughout the same:

Figure 1 represents a front elevational view of a Ford automobile equipped with our improved headlight structure.

Figure 2 is an enlarged detailed perspective view of a portion of the mounting and operating means for the light.

Figure 3 is a side elevational view, with parts broken away and shown in section, of the mounting means for the light.

Figures 4, 5 and 6 are perspective views of details of the device.

As before indicated, the invention is especially, but not necessarily designed for use in connection with Ford automobiles. For this reason we have illustrated such an automobile in the drawings in Fig. 1. By referring to this figure, it will be seen that the letter B designates the body of the car, and A designates the front axle, at the opposite end of which are the usual steering wheels W. Connected with the knuckles of the wheels is the usual transverse steering rod R with which the upwardly inclined rod R' is pivotally connected as shown, the latter being connected with the steering wheel by the usual universal joint J.

While it is not necessary, we prefer to have our improved device operated from the steering mechanism above described so that when the steering wheel is rotated to the right or left, the headlights will be correspondingly rotated in the same direction, thus causing the rays of light to accurately follow the path of the front wheels, so that the car can be driven around bends in the road and short turns with safety. In carrying out the invention we make use of an operating rod 1 which has one of its laterally directed ends connected with the existing universal joint J as indicated at 2. It may be mentioned that this laterally directed end of the rod is formed at its free end with a flat head 3 and this head is notched to properly fit against the universal joint, the head being bolted or otherwise secured to the latter as better shown in Fig. 2. The opposite end of the rod 1 is directed laterally in an opposite direction to the end described, as indicated at 4 and serves a purpose to be hereinafter set forth.

In accordance with one of the foregoing assertions, we rigidly connect the light mounting or bearing brackets 5 with the existing fender-supporting and light-supporting rods F. It will be recalled that the light-supporting rods F are provided between their ends with bearings in which the stems 6 of the headlights 7 are rotatably received, these bearings being indicated by the numerals 8. Instead of placing the stems of the lights in the bearings, we pass bolts 9 through the bearings and secure them in place against rotation by nuts 10 as clearly shown in Fig. 3, these bolts serving to connect the rearward extensions of aforesaid brackets 5 with the rods F. Proceeding, we wish to state that although the brackets 5 could be otherwise constructed, we prefer to construct them so that they are substantially U-shaped to include upper and lower spaced arms 11 and 12 respectively and rearward extensions. Each upper arm 11 is formed at its outer end with a relatively large opening and the lower arm is formed directly beneath these openings with smaller openings, the stems 6 of the lights passing through these openings. We are led to state at this point that the stems or the like, as usual, are equipped with stops or lugs 13 and these lugs rest on the upper faces of the lower arms of the brackets and to permit the lug to be inserted through the openings in the upper arm, such openings must be made sufficiently large. To prevent undue movement of the stems of the lights after they have been inserted through the openings in the arms, we make use of two-part bushings or bearings 14 having reduced portions fitted into the enlarged openings in the upper arms of the brackets. The lower ends of the light shafts or stems which extend beyond the lower arms of the brackets are flattened by means of a file or the like as indicated at 15.

For the purpose of imparting rotation to the lights, we make use of a substantially L-shaped lever 16 which cooperates with the right-hand light mounting bracket 5 as clearly shown in Fig. 2. By referring to this figure it will be seen that the long arm of the lever is provided between its ends with a non-circular opening, through which the flattened portion of the adjacent light shaft passes, a nut 17 being placed on the exposed or extended screw-threaded end of this shaft to maintain the lever in place, that is, connected with the mounting lever 5. This construction however, permits the lever to rotate with respect to the stationary bracket for the purpose of imparting rotation to the light standard. This long arm of the bracket 16 is extended beyond the lower arm 12 to permit a cross rod 18 to be pivotally connected therewith. This cross rod 18 is clearly shown in Fig. 1 and by referring to this figure it will be seen that it is properly bent to permit clearance of the crank handle when cranking the car. At the opposite end, the rod 18 is pivotally connected with a short link or plate 19 of the type shown in detail in Figure 6, this plate being formed with a non-circular opening at one end which is connected with the flat-faced portion of the remaining light shaft in a manner like that already described. With this arrangement it will be seen that when the right-hand light is rotated, the remaining light will be simultaneously rotated by means of the cross rod 18. At this point, it may well be pointed out that an adjustable coupling 20 serves to detachably connect the cross rod 18 with the right-hand head-light, and, as before pointed out, this is advantageous in that it permits this light to be rendered free so that it can be rotated through an entire revolution to permit it to be used as a "trouble light." This is a feature on which particular emphasis is to be laid. Referring again to the lever 16, it will be seen that this part of the invention is equipped with angular rounded depending portion 21 which is disposed in spaced parallelism with respect to the laterally directed portion 4 of the operating rod 1. Adjustable stop collars 22 are slidably arranged on the portion 4 of the rod 1 and the co-operating rounded portion 21 of the bracket 16 and the spaced arms of the forked heads 23 straddle these collars. By closely examining the showing in Figure 2 it will be seen that these cross heads are connected together by a turn knuckle 24 and this manner of connecting the operating rod, is advantageous in that it permits the rotation of the headlights to be limited by sliding the collars and forked heads along the parts on which they are mounted and adjusting the turn knuckle as is obvious.

From the foregoing description, it will be seen that when the steering rod is turned in one direction or the other to impart a similar turning movement to the front wheels, it will actuate the operating rod 1 in such a way that it, through its connection with the lever 16, will move the latter in a corresponding direction so that the lights will be caused to assume an angle like that taken by the front wheels. Rotation is imparted to the right-hand light shaft by means of the non-rotatable connection between the light shaft and lever 16, and simultaneous movement of the remaining light is brought about by the connecting rod 18. As before pointed out, the extreme points to which the lights can be moved is governed by adjusting the parts 22 and 23 along the rounded extension 21, and the parallel rounded portion 4 of the operating rod 1 after properly adjusting the turn knuckle 24. By disconnecting the coupling 20, the right-hand headlight may be removed independent of the remaining light and can be used instead of a special "trouble light" because it can then be turned to the rear and the rays of light directed on the engine or other part of the machine.

By carefully considering the description in connection with the drawings, persons familiar with devices of this class will doubtless be able to obtain a clear understanding of the invention. Therefore, a more lengthy and detailed description is deemed unnecessary.

Since probably the best results may be obtained with the construction and arrangement herein shown and described, this is taken as the preferred embodiment of the invention. However, we wish it to be understood that minor changes coming within the scope of the subjoined claim may be resorted to if desired.

We claim:

A device of the class described comprising a substantially U-shaped bracket embodying a rearward extension adapted to be rigidly connected to a relatively stationary part of an automobile, the arms of this bracket being equipped at their free ends with bearing openings adapted to rotatably receive the standard of a headlight, a substantially L-shaped lever disposed beneath and having its long arm contacting said bracket, said long arm having one end extending beyond the corresponding end of the lever and being equipped intermediate its ends with an opening receiving the flat-faced portion of the standard of the headlight for imparting rotation to said standard when the lever is operated, the depending short arm of said lever carrying a cylindrical rearward extension, an operating rod adapted to be connected at one end with a part of the automobile steering gear, the opposite end of said rod being bent laterally forward and disposed in spaced parallelism with said cylindrical extension, and a longitudinally extensible connection slidable on said extension and said laterally directed end of the rod.

In testimony whereof we have hereunto set our hands.

KARL BYE.
PHILIP WERLE.